(12) United States Patent
Coleman et al.

(10) Patent No.: US 6,185,939 B1
(45) Date of Patent: Feb. 13, 2001

(54) EXHAUST GAS RECIRCULATION SYSTEM

(75) Inventors: Gerald N. Coleman, Peoria; Michael J. Evancik, Chillicothe; Dennis D. Feucht, Morton; Keith E. Lawrence, Peoria; Jiubo Ma, Dunlap, all of IL (US)

(73) Assignee: Caterpillar Inc., Peoria, IL (US)

( * ) Notice: Under 35 U.S.C. 154(b), the term of this patent shall be extended for 0 days.

(21) Appl. No.: 09/273,968

(22) Filed: Mar. 22, 1999

(51) Int. Cl.[7] .................................................. F02B 33/44
(52) U.S. Cl. .................... 60/605.2; 60/278; 123/65 BA
(58) Field of Search ................................ 60/605.2, 278; 123/65 BA, 446; 623/559

(56) References Cited

U.S. PATENT DOCUMENTS

| | | |
|---|---|---|
| 3,149,454 | 9/1964 | Hahn . |
| 3,712,280 | 1/1973 | Brille et al. . |
| 4,048,968 | 9/1977 | Aoyama . |
| 4,231,225 | 11/1980 | Aya . |
| 4,702,218 * | 10/1987 | Yoshioka et al. ..................... 623/559 |
| 4,738,110 | 4/1988 | Tateno . |
| 4,903,488 | 2/1990 | Shibata . |
| 5,142,866 * | 9/1992 | Yanagihara et al. ................. 60/605.2 |
| 5,203,311 | 4/1993 | Hitomi et al. . |
| 5,425,239 | 6/1995 | Gobert ................................. 60/605.2 |
| 5,540,203 * | 7/1996 | Foulkes et al. ....................... 123/446 |
| 5,611,203 * | 3/1997 | Henderson et al. ................. 60/605.2 |
| 5,617,726 * | 4/1997 | Sheridan et al. .................... 60/605.2 |
| 5,771,868 | 6/1998 | Khair ................................... 123/570 |
| 5,802,846 * | 9/1998 | Bailey ..................................... 60/278 |
| 5,803,027 * | 9/1998 | Bell et al. ......................... 123/65 BA |
| 5,927,075 * | 7/1999 | Khair ................................... 60/605.2 |
| 5,937,650 * | 8/1999 | Arnold ................................. 60/605.2 |
| 6,003,315 * | 12/1999 | Bailey ................................. 60/605.2 |
| 6,038,860 * | 3/2000 | Bailey ................................. 60/605.2 |
| 6,062,026 * | 5/2000 | Woollenweber et al. ........... 60/605.2 |

* cited by examiner

Primary Examiner—Thomas Denion
Assistant Examiner—Thai-Ba Trieu
(74) Attorney, Agent, or Firm—Larry G. Gain

(57) ABSTRACT

Past exhaust emission control systems fail to utilize exhaust gas recirculation during all operating parameters of an engine. The present exhaust gas recirculation system reduces the emissions emitted from an engine during all operating parameters of the engine. The engine includes a cylinder, a rotatable crankshaft and a turbocharger defining a compressor section compressing a flow of intake air to a first preestablished pressure and being driven by a flow of exhaust gas having a first preestablished pressure. The exhaust gas recirculation system is comprised of a portion of the flow of exhaust gas being recirculated to the cylinder and forming a flow of recirculated exhaust gas. The flow of recirculated exhaust gas is cooled. A portion of the flow of intake air is compressed to a second preestablished pressure. The flow of recirculated exhaust gas is compressed to a second preestablished pressure being at least as great as the first preestablished pressure of the intake air. And, a quantity of the flow of recirculated exhaust gas is controlled by a valve having an open position in which intake air flows therethrough and a closed position in which the flow of intake air is blocked.

21 Claims, 4 Drawing Sheets

EXHAUST GAS RECIRCULATION SYSTEM

TECHNICAL FIELD

This invention relates generally to an engine and more particularly to a reduction of exhaust emissions.

BACKGROUND ART

The use of fossil fuel as the combustible fuel in engines results in the combustion products of carbon monoxide, carbon dioxide, water vapor, smoke and particulate, unburned hydrocarbons, nitrogen oxides and sulfur oxides. Of these above products carbon dioxide and water vapor are considered normal and unobjectionable. In most applications, governmental imposed regulations are restricting the amount of pollutants being emitted in the exhaust gases.

In the past, NOx emissions have been reduced by reducing the intake manifold temperature, controlling the injection timing (normally retarding), and modifying the injection rate shape. And, the adverse effects on fuel consumption, particulate emissions engine performance have largely been alleviated through improvements in the basic engine design and fuel selection. For example, at the present time smoke and particulates have normally been controlled by design modifications in the combustion chamber and injection pressure. Particulates are also controlled by traps and filters, and sulfur oxides are normally controlled by the selection of fuels being low in total sulfur. This leaves carbon monoxide, unburned hydrocarbons and nitrogen oxides as the emission constituents of primary concern in the exhaust gas being emitted from the engine.

Many systems have been developed for recycling a portion of the exhaust gas through the engine thereby reducing the emission of these constituents into the atmosphere. The recirculation of a portion of exhaust gas is used to reduce NOx pollution emitted to the atmosphere. In a naturally aspirated engine this process is relative simple. But, with a turbocharged engine, the recirculation of a portion of the exhaust gas into the intake air becomes more complex because the intake pressure may be higher than the exhaust pressure during many operating conditions. In many of such past system a volume of the exhaust gas from the engine was redirected to the intake air of the engine through the turbocharger and/or an aftercooler and to the engine. Such systems caused the premature plugging of aftercooler cores and malfunctioning of the systems. Additionally, with such recirculation system deterioration of the exhaust flow was caused by deposit buildup. Various approaches have been used to address the adverse pressure gradient issue. For example, throttling valves have been installed in the air inlet, back pressure valves in the exhaust gas, intake manifold venturi tubes, etc. to provide sufficient pressure drop to get the exhaust gas to flow to the intake air. Although this provides the necessary pressure drop to functionally operate an exhaust gas recirculation system several disadvantages, such as, fuel consumption, emissions, and/or performance occur.

The present invention is directed to overcoming one or more of the problems as set forth above.

DISCLOSURE OF THE INVENTION

In one aspect of the invention an exhaust gas recirculation system is used with an engine. The engine defines a plurality of operating parameters and has a rotatable crankshaft through which an engine speed can be defined. And, a plurality of cylinders are defined as a part of the engine. The exhaust gas recirculation system is comprised of a flow of intake air entering a respective one of the plurality of cylinders. The intake air is pressurized to a preestablished pressure. A supply of combustible fuel enters the respective one of the plurality of cylinders. A combustion process within the respective one of said plurality of cylinders defines a flow of exhaust gas having a preestablished pressure being less that said preestablished pressure of the intake air during at least a portion of the engine operating parameters. A portion of the exhaust gas is circulated to the intake air defining a flow of recirculated exhaust gas. The flow of recirculated exhaust gas is cooled prior to being pressurized to a preestablished level and the pressurization of the flow of recirculated exhaust gas being at least as great as the preestablished pressure of the intake air. And, the flow of recirculated exhaust gas is controlled to vary a quantity of recirculated exhaust gas depending on the operating parameter of the engine.

In another aspect of the invention an exhaust gas recirculation system is used with an engine. The engine has a cylinder and a rotatable crankshaft. The engine has a turbocharger defining a compressor section compressing a flow of intake air to a first preestablished pressure and is driven by a flow of exhaust gas having a first preestablished pressure. The exhaust gas recirculation system is comprised of a portion of the flow of exhaust gas being recirculated back to the cylinder and forming a flow of recirculated exhaust gas. The flow of recirculated exhaust gas is cooled. The flow of recirculated exhaust gas being compressed to a second preestablished pressure. The second preestablished pressure of the flow of exhaust gas being at least as great as the first preestablished pressure of the intake air during a portion of an operating parameter of the engine. And, a portion of the flow of intake air being mixed with the flow of recirculated exhaust gas prior to the flow of recirculated exhaust gas being compressed to the second preestablished pressure.

In another aspect of the invention a method of reducing exhaust emissions from an engine having a flow of intake air being at a preestablished pressure and a flow of exhaust gas being at a preestablished pressure being less than the preestablished pressure of the intake air. The method of reducing exhaust emission is comprised of the steps of extracting a portion of the flow of exhaust gas forming a flow of recirculation exhaust gas. Cooling the flow of recirculation exhaust gas. Increasing the pressure of the flow of recirculation exhaust gas to a quantity being at least equivalent to the pressure of the flow of intake air. And, blending the flow of recirculation exhaust gas and a portion of the flow of intake air prior to the pressure of the flow of recirculation gas being increased to a quantity being at least equivalent to the pressure of the flow of intake air.

BEST MODE FOR CARRYING OUT THE INVENTION

Figure 1:
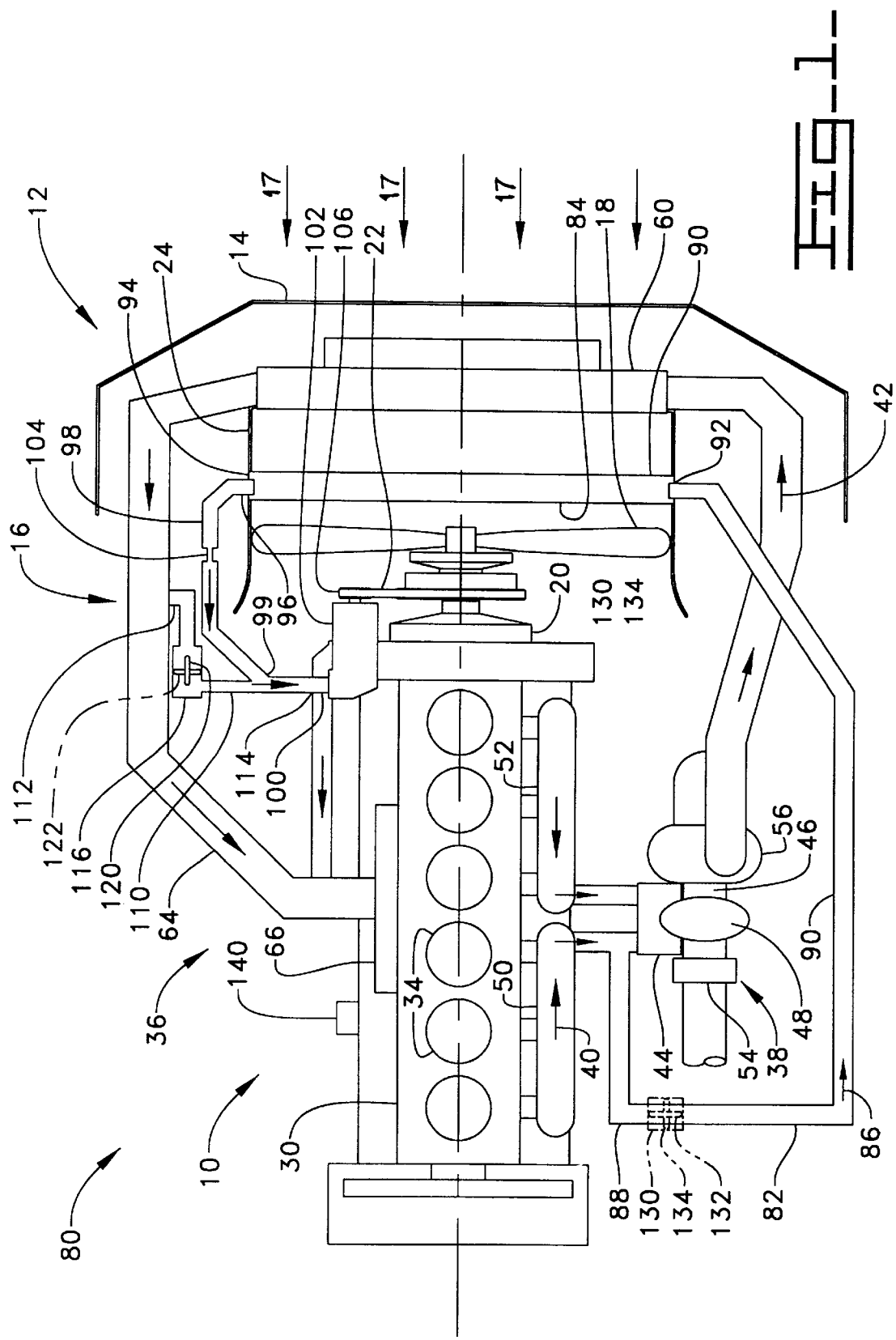
FIG. 1 is a schematic view of an engine embodying an exhaust gas recirculation system.

Referring to FIGS. 1, 2, 3 and 4, an engine 10 has a plurality of operating parameters and is operatively positioned in a truck chassis 12, not shown in its entirety. The truck chassis 12 defines a frontal portion 14 and has the engine 10 removably attached to the truck chassis 12. A conventional cooling system 16 has a part thereof attached to the truck chassis 12. The cooling system 16, in this application, has a flow of ambient air 17 passing therethrough being used for cooling. A fan 18 is attached to the engine 12 and is driven by a crankshaft 20 of the engine 10. The fan 18 is operatively driven by a belt 22 in a conventional manner. However, as an alternative, the fan could be driven by a motor and could be remotely attached to the chassis 12 or in other conventional manners without changing the essence of the invention. A radiator 24 is mounted in the truck chassis 12 and is interposed the fan 18 and the frontal portion 14. The radiator 24 operatively cools the engine 10 in a conventional manner.

The engine 10 includes a block 30 having a plurality of cylinder 34 therein. For example, an inline-6 cylinder is shown; however, as an alternative an inline-4 or a V configuration could be used without changing the essence of the invention. The engine 10 includes an air intake system 36 and an exhaust system 38. After a combustion process, a flow of exhaust gas designated by the arrows 40 exits each of the respective plurality of cylinders 34 at a first preestablished pressure. A flow of intake air designated by the arrows 42 enters each of the respective plurality of cylinders 34 through the air intake system 36 as will be defined later. The exhaust gas 40 exits through the exhaust system 38 in a conventional manner.

The exhaust system 38 includes an exhaust manifold 44 being attached to the block 12 and has the flow of exhaust gas 40 exits the plurality of cylinders 34 of the engine 10 passing therethrough. A turbocharger 46 is a part of the exhaust system 38 and is attached to the engine 10, as will be explained further. A turbine section 48 is operatively connected to and driven by the flow of exhaust gas 40 from the combustion process within the plurality of cylinders 34. For example, in this application, a first exhaust manifold portion 50 is connected to a first set of three cylinders and a second set of three cylinders 34 are connected a second exhaust manifold portion 52. The turbine section 48 is connected to each of the first exhaust manifold portion 50 and the second exhaust manifold portion 52. The flow of exhaust gas 40 exits an exhaust opening 54 in the turbine section 48 and passes through a muffler, not shown, to the atmosphere. The turbocharger 46 further includes a compressor section 56 being driven by the turbine section 48 in a conventional manner.

The air intake system 36 is operatively connected to the compressor section 56 of the turbocharger 46 in a conventional manner. The flow of intake air 42 is communicated from the atmosphere through a filter, not shown, to the compressor section 56 of the turbocharger 46 in a convention manner. The compressor section 56 pressurizes the intake air 42 to the first preestablished pressure level. During some operation parameters of the engine 10, the first preestablished pressure of the intake air 42 is above the first preestablished pressure level of the exhaust gas 40. Other conventional system could be use to increase the pressure of the intake air 42 without changing the jest of the invention. The intake air 42 is communicated from the compressor section 56 through an aftercooler 60 by a first conduit 62. In this application, the aftercooler 60 is an air to air aftercooler being operatively positioned between the radiator 24 and the frontal portion 14. From the aftercooler 60, the intake air 42 passes through a second conduit 64 and operatively enters the respective one of the plurality of cylinders 34 through an intake manifold 66.

Figure 2:
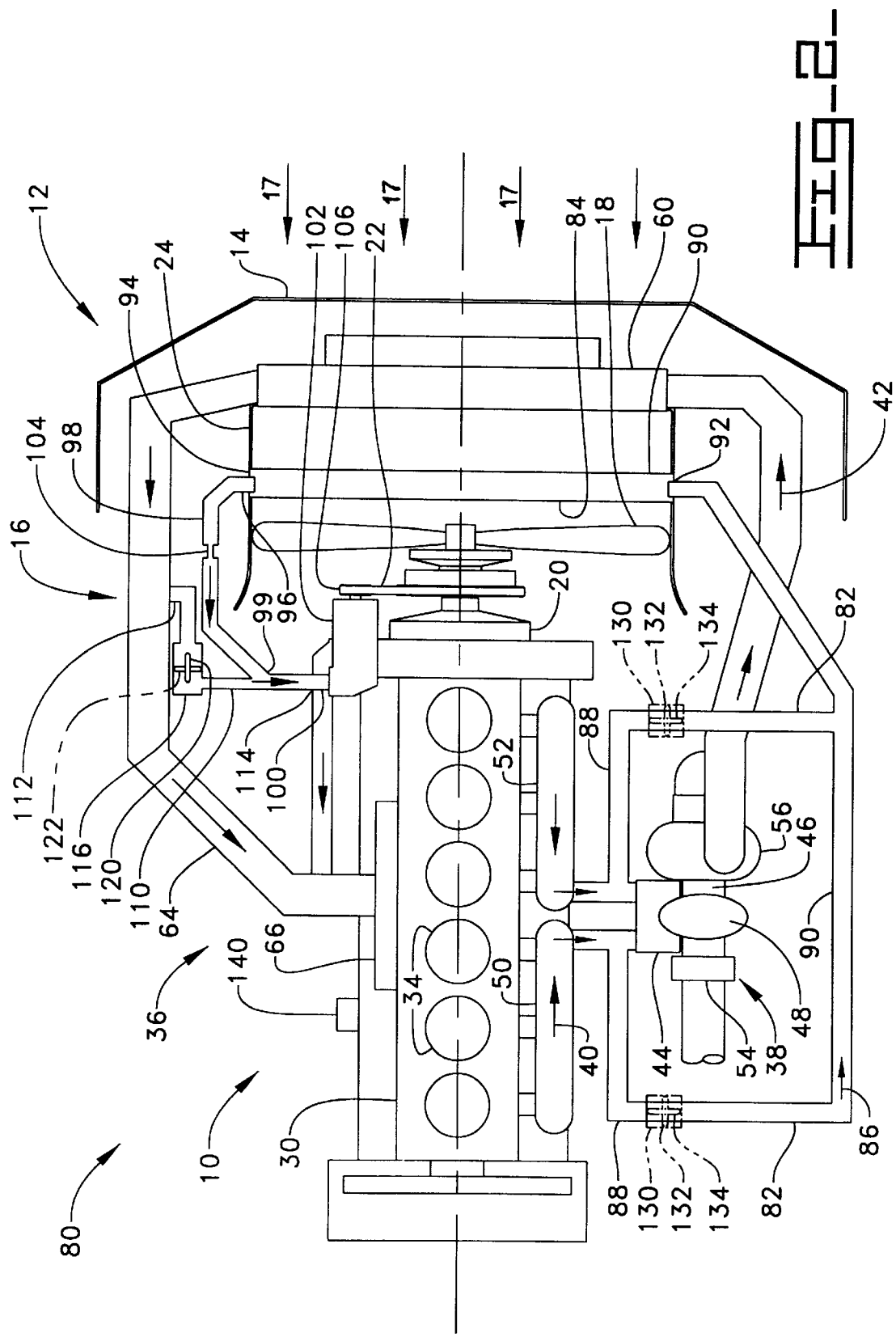
FIG. 2 is a schematic view of an engine embodying an additional exhaust gas recirculation system.

An exhaust gas recirculation system 80 is operatively attached to the engine 10. The exhaust gas recirculation system 80 includes a supply line 82 being operatively connected between the flow of exhaust gas 40 and an exhaust gas recirculation cooler 84. The exhaust gas recirculation cooler 84 is positioned in fluid heat exchanging relationship with the flow of ambient cooling air 17. The ambient cooling air passes through the frontal portion 14 of the truck chassis 12. And ,the exhaust gas recirculation cooler 84, in this application, is positioned in line with the aftercooler 60 and the radiator 24. The exhaust gas recirculation cooler 84 is connected to the chassis 12. The exhaust gas recirculation cooler 84 has a portion of the exhaust gas 40 flowing therethrough forming a flow of recirculated exhaust 86. In one alternative as best shown in FIG. 1, the supply line 82 has a first end portion 88 attached to or near the intersection of the first exhaust manifold portion 50 and the second exhaust manifold portion 52 or the exhaust manifold 44. A second end portion 90 of the supply line 82 is attached to an inlet end portion 92 of the exhaust gas recirculation cooler 84. In another alternative as best shown in FIG. 2, a pair of supply lines 82 have the first end portion 88 attached to or near each of the first exhaust manifold portion 50 and the second exhaust manifold portion 52. The second end portion 90 of each of the pair of supply lines 82 is attached to the inlet end portion 92 of the exhaust gas recirculation cooler 84.

An outlet end 94 of the exhaust gas recirculation cooler 84 has a first end 96 of a second tube 98 attached thereto. A second end 99 of the second tube 98 is attached to an inlet portion 100 of a blower 102. Within the blower or positive displacement pump 102, the exhaust gas recirculation 86 is pressurized to a second preestablished pressure being at least as great as the first preestablished pressure of the intake air 42. Interposed in the first end 96 and the second end 99 of the second tube 98 is an orifice 104. The orifice 104 has a preestablished configuration and size to produce a preselected pressure drop.

The blower 102 is attached to the engine 10 in a conventional manner and is driven by the engine 10 crankshaft 20 by a conventional belt system 106. The blower 102 is driven at a fixed speed ratio as compared to an engine 10 speed. The blower 102 can be driven off either the engine crankshaft 20 or the engine mounted cooling fan 18. As a further alternative, the blower 102 could be driven externally by a hydraulic motor or an electric motor without changing the essence of the invention.

The exhaust gas recirculation system 80 further includes a third tube 110 being interposed in the second conduit 64 and the inlet portion 100 of the blower 102. In this application, a first end 112 of the third Lube 110 is attached to the second conduit 64 and a second end 114 of the third tube 110 is attached to the inlet portion 100 of the blower 102. In this application, the second end 99 of the second tube 98 is attached to the third tube 110 prior to the position where the second end 114 of the third tube 110 is attached to the inlet portion 100 of the blower 102. As an alternative, the second end 99 of the second tube 98 and the second end 114 of the third tube 110 could be attached to the inlet portion 100 of the blower 102.

A mixing valve 116 is located in the third tube 110. For example, the mixing valve 116 is positioned between the first end 112 of the third tube 110 and the intersection of the second tube 98 with the third tube 110. The mixing valve 116 is movable between an open position 120 and a closed position 122, shown in phantom, and varies the area through which the intake air 42 will flow. The mixing valve 116 is infinitely movable between the open position 120 and the closed position 122. As an alternative, the mixing valve 116 can be integrated into the blower 102.

As an option for use with the exhaust gas recirculation system 80, an on-off valve 130, shown in phantom, can be located in the supply line 82 as shown in FIG. 1. Or, as a further alternative, a pair of on-off valves 130, shown in phantom, can be located in the pair of supply lines 82 as shown in FIG. 2. And, the on-off valve or valves 130 are positioned closer to the first end 88 of the supply line 82 than to the second end 90 of the supply line 82. The on-off valve or valves 130 are movable between an open position 132 and a closed position 134, shown in phantom.

Figure 3:
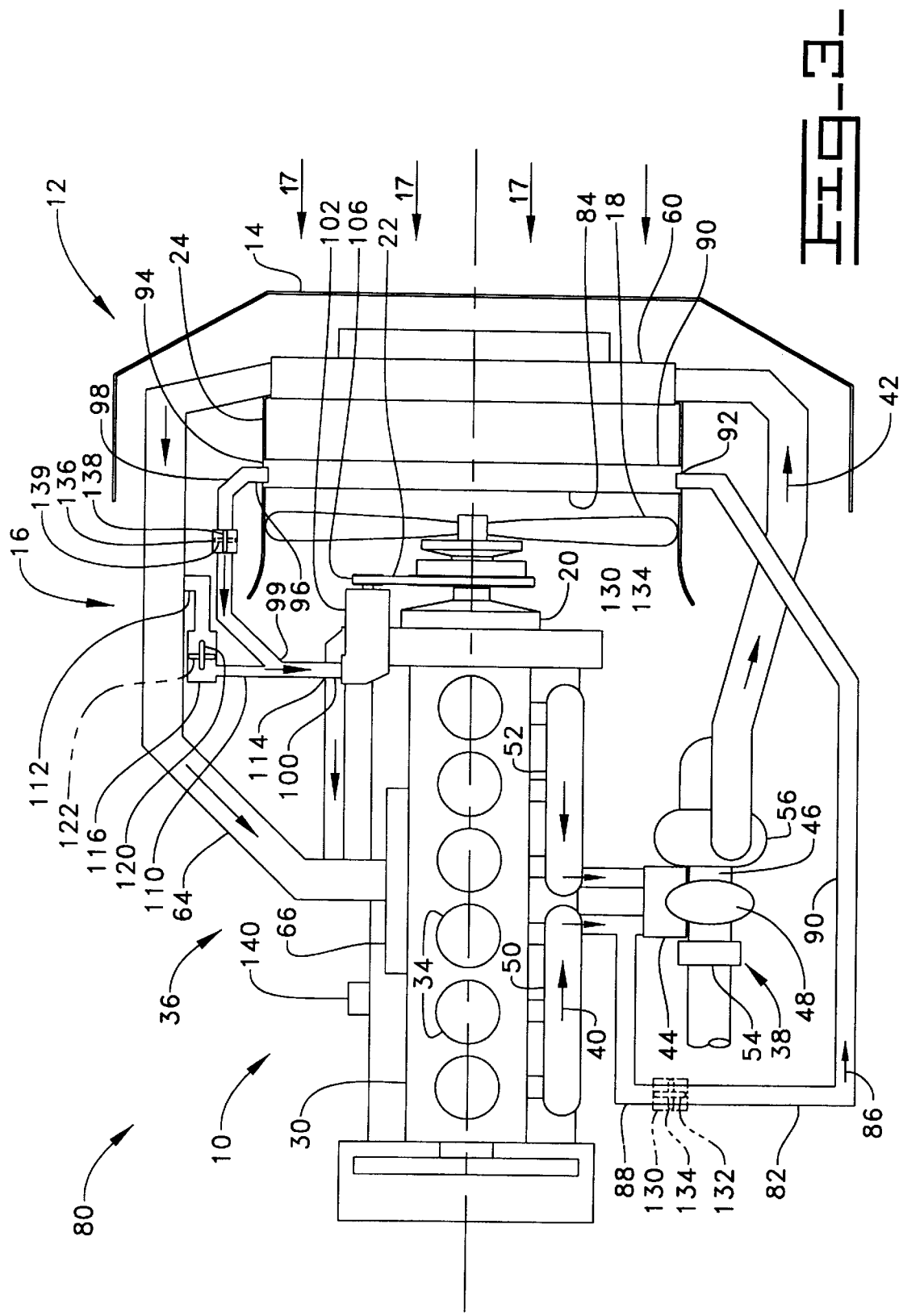
FIG. 3 is a schematic view of an engine embodying an additional exhaust gas recirculation system.
Figure 4:
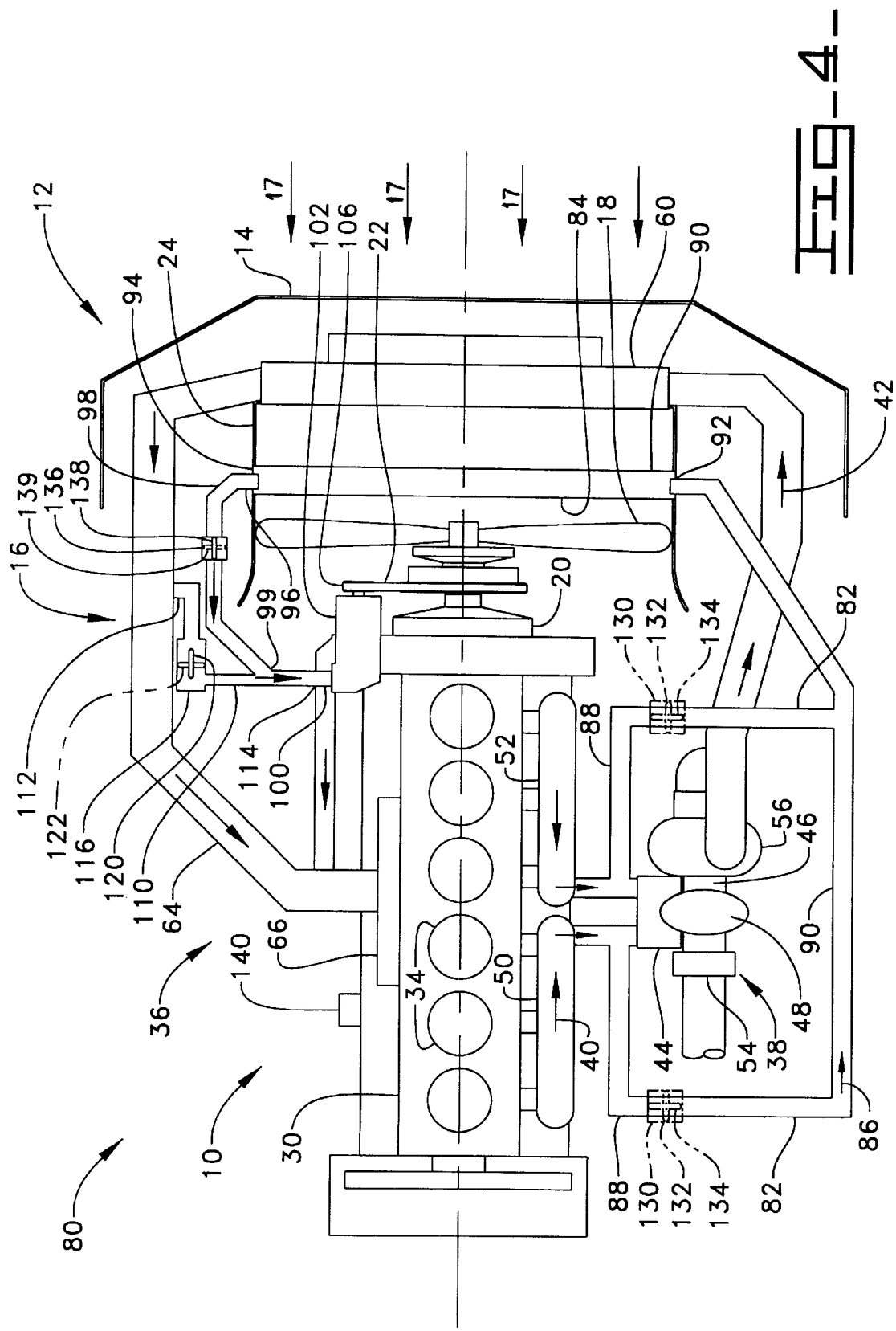
FIG. 4 is a schematic view of an engine embodying an additional exhaust gas recirculation system.

As a further option for use with the exhaust gas recirculation system 80, a proportional valve 136 as shown in FIGS. 3 and 4 can be used to replace the orifice 104. The proportional valve 136 is movable between an open position 138 and a closed position 139, shown in phantom, through a plurality of infinite positions. The proportional valve 136 is interposed in the first end portion 96 and the second end 99 of the second tube 98. With the exhaust gas recirculation system 80, as shown in FIGS. 2 and 4, it is desirable to use a single actuator to control the position of the on-off valve or valves 130. The single actuator will control the position of the on-off valve 130 in each of supply line 82 and the pair of supply lines 82 from the respective first exhaust manifold 50 and the second exhaust manifold 52.

A control system 140 operatively monitors engine 10 operating parameters and depending on the parameters of the engine 10 varies the position of the mixing valve 116, the optional on-off valve 130 and the optional proportional valve 136 if used.

A conventional fuel system, not shown, is used with the engine 10.

INDUSTRIAL APPLICABILITY

In use, the engine 10 is started. Fuel is supplied to each of the plurality of cylinders 34. Intake air 42 is supplied to the engine 10. For example, intake air 42 enters the compressor section 48 and is compressed increasing in pressure and temperature. From the compressor section 50, intake air 42 passes through the aftercooler, is cooled becoming more dense and enters into the respective one of the plurality of cylinders 34. Within the plurality of cylinders 34 the intake air 42 and the fuel are combusted. After combustion, the flow of exhaust gas 40 enters one of the first exhaust manifold portion 50 or the second exhaust manifold portion 52 of the exhaust manifold 44. The flow of exhaust gas 40 enters the turbine section 48 of the turbocharger 46 and drives the compressor section 56. After flowing through the turbocharger 46, the exhaust gas 40 exits through a muffler to the atmosphere.

With the engine 10 operating, the blower 102 is operating at a fixed speed ratio compared to the speed of the crankshaft 20 within the engine 10. For example, in this application, the speed ratio of the blower 102 is greater than that of the engine 10 crankshaft. With the mixing valve 116 in the open position 120, intake air 42 from the compressor section 56 is drawn through the blower 102. The intake air 42 is accelerated and compressed by the blower 102. From the blower 102 the intake air 42 is directed to the intake manifold 66 to be distributed to the plurality of cylinders 34.

With the mixing valve 116 in the closed position 122 intake air 42 is prevented from entering the blower 102. Thus, exhaust gas 40 is drawn through the blower 102. The exhaust gas 40 is accelerated and compressed by the blower 102. This results in the pressure of the exhaust gas 40 being at least as high as that of the turbocharged intake air 40 within the intake manifold 66. The result being, exhaust gas 40 is circulated into and mixed with the intake air 42 within the intake manifold 66. The mixed intake air 42 and the recirculated exhaust gas 40 are distributed to the plurality of cylinders 34 reducing emissions.

With the mixing valve 116 positioned between the open position 120 and the closed position 122 a combination of intake air 42 and exhaust gas 40 enters the blower 102. For example, with the mixing valve 116 nearer the open position 120 a greater amount of intake air 42 verses exhaust gas 40 is drawn into the blower 102. Conversely, with the mixing valve 116 neared the closed position 122 a greater amount of exhaust gas 40 verses intake air 42 is drawn into the blower 102. Thus, exhaust gas 40 and intake air 42 are drawn through the blower 102. The exhaust gas 40 and the intake air 42 are partially mixed before entering the blower 102 and are further mixed within the blower 102. The combination of exhaust gas 40 and intake air 42 are accelerated and compressed by the blower 102. This results in the pressure of the combined exhaust gas 40 and intake air 42 being at least as high as that of the turbocharged intake air 40 within the intake manifold 66. The result being, combined exhaust gas 40 and intake air 42 are circulated into and further mixed with the intake air 42 within the intake manifold 66. The intake air 42 and combined exhaust air 40 and the intake air 42 are distributed to the plurality of cylinders 34 reducing emissions.

As shown in FIGS. 1 and 2, the orifice 104 is positioned upstream of the blower 102 in the exhaust gas recirculation line of second tube 96. The orifice 104 insures the pressure level at the second end 99 of the second tube 98 is lower than the pressure level within the third tube 110. With the alternative proportional valve 136 as shown in FIGS. 3 and 4, the pressure level at the second end 99 of the second tube 98 is maintained at a lower pressure level than the pressure level within the third tube 110.

As an alternative, the on-off valve or valves 130 are positioned in the first tube 86 and controls the flow of exhaust gas 40 to the air to air cooler 84. For example, by controlling the flow of exhaust gas 40 to the air to air cooler 84 all of the flow of exhaust gas 40 can be prevented from circulating or passing to the air to air cooler 84.

The exhaust gas recirculation system 80, overcomes the problem of flowing exhaust gas 40 into the engine 10 intake manifold 66 at times when the intake manifold 66 intake air 42 pressure is greater than the exhaust gas 40 pressure by use of the blower 102. With the orifice 104 or the proportional valve 136, the exhaust gas 40 has a predetermined pressure drop enabling the rate of exhaust gas 40 recirculation to be controlled using the single mixing valve 116. The optional on-off valve 130 can be used to completely shut off the exhaust gas 40 flow for transient engine operation.

Additionally, as shown in FIGS. 3 and 4, the orifice 104 has been replaced by the proportional valve 136. With the proportional valve 136 being infinitely variable between the open position 138 and the closed position 139 the quantity of recirculated exhaust gas 40 is controlled between a maximum quantity at the open position 138 to a minimum quantity at the closed position 139.

Other aspects, objects and advantages of this invention can be obtained from a sturdy of the drawings, the disclosure and the appended claims.

What is claimed is:

1. An exhaust gas recirculation system for use with an engine, said engine defining a plurality of operating parameters, having a rotatable crankshaft through which an engine speed can be defined and a plurality of cylinders being defined as a part of the engine, said exhaust gas recirculation system comprising:

a flow of intake air entering a respective one of said plurality of cylinders, said intake air being pressurized to a preestablished pressure;

a supply of combustible fuel entering said respective one of said plurality of cylinders;

a combustion process within said respective one of said plurality of cylinders defining a flow of exhaust gas having a preestablished pressure being less than said preestablished pressure of said intake air during at least a portion of said engine operating parameters;

a portion of said exhaust gas being circulated to said intake air defining a flow of recirculated exhaust gas, said flow of recirculated exhaust gas being cooled prior to being pressurized to a preestablished level and said pressurization of said flow of recirculated exhaust gas being at least as great as said preestablished pressure of said intake air; and said flow of recirculated exhaust gas being controlled to vary a quantity of recirculated exhaust gas depending on said operating parameter of said engine, said flow of recirculated exhaust gas controlled to vary a quantity of recirculated exhaust gas being controlled by a proportional valve.

2. The exhaust gas recirculation system of claim 1 wherein a portion of said intake air being further pressurized to a level being greater than said preestablished pressure of said intake air.

3. The exhaust gas recirculation system of claim 2 wherein said flow of recirculated exhaust gas being pressurized by a blower, said blower being driven at a speed being greater than said speed of said engine and said further pressurized intake air being pressurized by said blower.

4. The exhaust gas recirculation system of claim 3 wherein said blower being connected to said engine.

5. The exhaust gas recirculation system of claim 2 wherein said portion of said intake air being further pressurized being controlled by a valve, said valve being operable between an open position and a closed position.

6. The exhaust gas recirculation system of claim 5 wherein said valve being operable between said open position and said closed position through an infinite number of positions, as said infinite number of positions being operatively controlled by said operating parameters of said engine.

7. The exhaust gas recirculation system of claim 5 wherein said valve being in said open position defining a minimum flow of recirculated exhaust.

8. The exhaust gas recirculation system of claim 5 wherein said valve being in said closed position defining a maximum flow of recirculated exhaust.

9. The exhaust gas recirculation system of claim 1 wherein said flow of recirculated exhaust gas is being cooled by an air to air cooler.

10. The exhaust gas recirculation system of claim 1 wherein said flow of recirculated exhaust gas controlled to vary a quantity of recirculated exhaust gas being controlled by an orifice.

11. The exhaust gas recirculation system of claim 1 wherein said flow of recirculated exhaust gas controlled to vary a quantity of recirculated exhaust gas being controlled by an on-off valve.

12. An exhaust gas recirculation system for use with an engine having a cylinder and a rotatable crankshaft, said engine having a turbocharger defining a compressor section compressing a flow of intake air to a first preestablished pressure and being driven by a flow of exhaust gas having a first preestablished pressure, said exhaust gas recirculation system comprising:

a portion of said flow of exhaust gas being recirculated back to said cylinder and forming a flow of recirculated exhaust gas;

said flow of recirculated exhaust gas being cooled;

said flow of recirculated exhaust gas being compressed to a second preestablished pressure being at least as great as said first preestablished pressure of said intake air during a portion of an operating parameter of said engine;

a portion of said flow of recirculated exhaust gas being controlled by a valve, said valve having an open position in which said portion of said flow of intake air being further compressed to a second preestablished pressure flows therethrough and a closed position in which said flow of intake air is blocked;

a portion of said flow of intake air being mixed with said flow of recirculated exhaust gas prior to said flow of recirculated exhaust gas being compressed to said second preestablished pressure; and said flow of recirculated exhaust gas and said portion of said flow of intake air passing through said valve each being further compressed to a level being equivalent to that of the second preestablished pressure of said flow of recirculated exhaust gas.

13. The exhaust gas recirculation system of claim 12 wherein said flow of recirculated exhaust gas is at a maximum quantity with said valve in said closed position.

14. The exhaust gas recirculation system of claim 12 wherein said flow of recirculated exhaust gas is at a minimum quantity with said valve in said open position.

15. The exhaust gas recirculation system of claim 12 wherein said valve is infinitely movable between said open position and said closed position.

16. The exhaust gas recirculation system of claim 12 wherein said quantity of said flow of recirculated exhaust gas being further controlled by a proportional valve.

17. The exhaust gas recirculation system of claim 12 wherein said quantity of recirculated exhaust gas being further controlled by an on-off valve.

18. An exhaust gas recirculation system for use with an engine, said exhaust gas recirculation system comprising:

a flow of exhaust gas and a portion of said flow of exhaust gas forming a flow of recirculated exhaust gas being recirculated to said engine;

an exhaust gas recirculation cooler being positioned within a chassis, said chassis defining a frontal portion; and an ambient cooling air passing through said frontal portion and flowing through said exhaust gas recirculation cooler.

19. The exhaust gas recirculation system of claim 18 wherein said flow of ambient cooling air being in heat exchanging relationship with said exhaust gas recirculation cooler.

20. The exhaust gas recirculation system of claim 18 further including a radiator being positioned in said chassis and said exhaust gas recirculation cooler being in heat exchanging relationship with said ambient cooling air after said ambient cooling air passing through said radiator.

21. The exhaust gas recirculation system of claim 20 further including an aftercooler being positioned in said chassis and said ambient cooling air passing through said aftercooler and said radiator prior to passing through said exhaust gas recirculation cooler.

* * * * *